Jan. 7, 1969    K. T. LEE    3,420,633
REMOVAL OF IMPURITIES FROM HYDROGEN
Filed Sept. 27, 1966
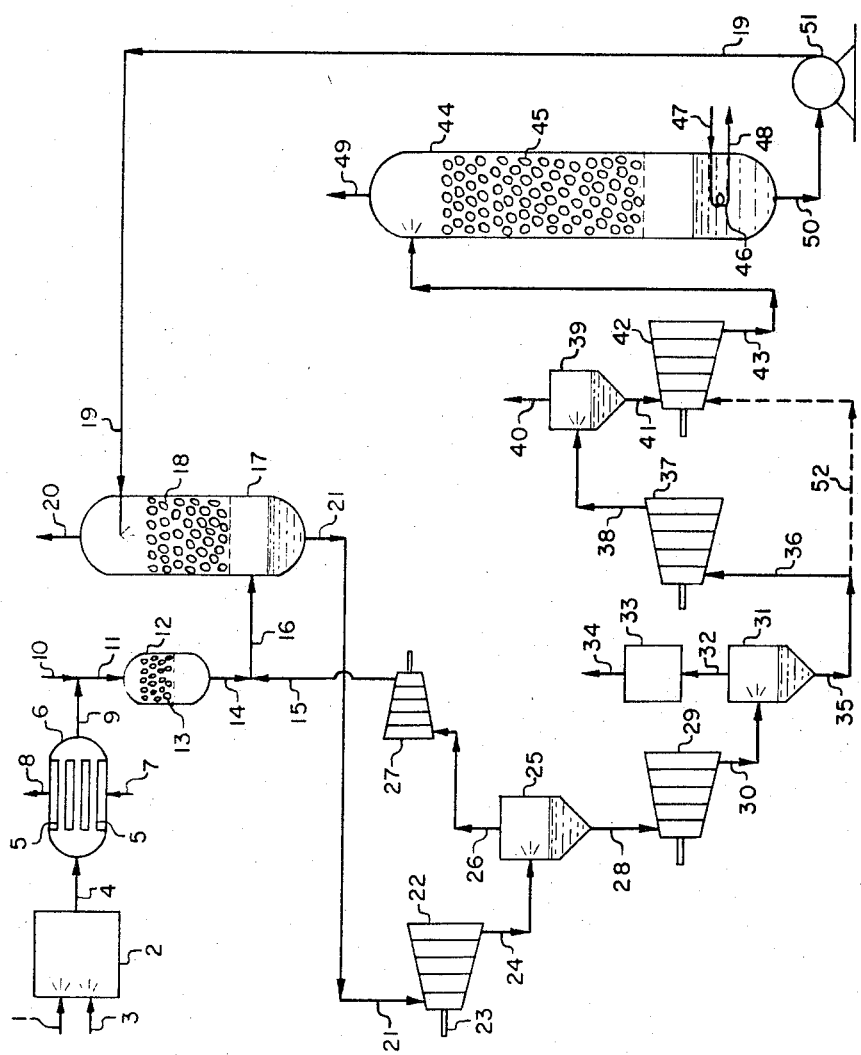
KWO T. LEE
INVENTOR.
BY J. T. Chaboty
AGENT United States Patent Office 3,420,633
Patented Jan. 7, 1969

3,420,633
REMOVAL OF IMPURITIES FROM HYDROGEN
Kwo T. Lee, Jackson Heights, N.Y., assignor to Chemical Construction Corporation, New York, N.Y., a corporation of Delaware
Filed Sept. 27, 1966, Ser. No. 582,274
U.S. Cl. 23—210   11 Claims
Int. Cl. C01b 1/33; F25j 3/08

ABSTRACT OF THE DISCLOSURE

Crude hydrogen gas containing carbon dioxide and hydrogen sulfide impurities is scrubbed with aqueous liquid triethanolamine solution to remove the impurities from the hydrogen gas. Rich triethanolamine solution containing carbon dioxide, hydrogen sulfide and some dissolved hydrogen is regenerated by reducing the pressure in successive stages whereby a hydrogen rich gas phase, a carbon dioxide rich gas phase and a hydrogen sulfide rich gas phase are, respectively, separated. The hydrogen rich gas phase is recycled to the crude hydrogen gas stream entering the scrubber.

---

The present invention relates to the removal of carbon dioxide and hydrogen sulfide impurity from crude gaseous hydrogen, by scrubbing the crude hydrogen gas stream at elevated pressure with aqueous triethanolamine solution. The resulting rich triethanolamine solution containing dissolved hydrogen, carbon dioxide and hydrogen sulfide is regenerated in an improved manner by stages of pressure reduction, so as to evolve in succession a hydrogen-rich recycle gas stream, a gaseous stream of substantially pure carbon dioxide, and a hydrogen sulfide-rich gas stream suitable for direct conversion to elemental sulfur by the Claus process.

Hydrogen is commercially produced by several processes, of which the most important are partial oxidation or catalytic steam reforming of fluid hydrocarbons. The fluid hydrocarbon which is usually employed in these processes, such as natural gas, a liquid petroleum fraction such as Bunker C residual oil, or crude oil, usually contains a significant proportion of sulfur. Thus, the crude hydrogen which is commercially produced by the processes mentioned supra, or other similar processes, contains a significant amount of hydrogen sulfide as well as carbon dioxide. These acidic gas components must be removed from the crude hydrogen, prior to hydrogen utilization in catalytic ammonia or methanol synthesis or other usages.

Numerous procedures employing various solvents or reactants have been developed in the prior art for the removal of carbon dioxide and hydrogen sulfide from crude hydrogen. The most important commercial processes employ a suitable liquid solvent to scrub the crude hydrogen, usually at elevated pressure. The impurity-laden solvent is then regenerated at reduced pressure, usually by heating. Among the various solvents which have been employed for this purpose are water, aqueous solutions of alkali carbonates, and aqueous solutions of ethanolamines such as monoethanolamine or triethanolamine. These and other useful solvents have been suggested in U. S. Patents Nos. 1,533,733; 1,783,901; 1,836,-659; 2,144,692; 2,318,522; 2,477,314; 2,613,132; 2,747,-962; 2,943,910; 2,994,578; 3,121,624 and 3,191,361; Canadian Patents Nos. 541,995; 665,623; 682,072; 732,445; 732,446 and 732,447; French Patent No. 1,081,079 and Japanese Patent No. 130,249. It is evident that many solvents are effective for the removal of carbon dioxide and hydrogen sulfide from crude hydrogen.

The impurity-laden solvent is usually regenerated in one stage, to evolve a mixed gas stream containing carbon dioxide and hydrogen sulfide together with a small proportion of previously dissolved hydrogen. The recovery and re-utilization of this small proportion of hydrogen is important from the viewpoint of process economics, and in many instances a pure carbon dioxide gas stream is needed, as in the synthesis of urea by the high pressure reaction of ammonia and carbon dioxide. The useful recovery of hydrogen sulfide is also important, due to the sulfur values as well as pollution considerations which preclude the discharge of hydrogen sulfide to the atmosphere. The separation of purified components from the mixed gas stream produced by single stage regeneration is a difficult and costly procedure. The multiple stage regeneration procedures of the prior art, as taught in several of the patents mentioned supra, do not obtain a satisfactory separation of purified components from impurity-laden solvents when the solvent contains dissolved hydrogen, carbon dioxide and hydrogen sulfide.

In the present invention, aqueous triethanolamine solution is employed as a selective solvent for the high pressure scrubbing of carbon dioxide and hydrogen sulfide from crude hydrogen. The rich impurity-laden solution, containing dissolved hydrogen as well as carbon dioxide and hydrogen sulfide, is then regenerated by pressure reduction in a plurality of stages at successively reduced pressure levels, with three stages being employed when the hydrogen sulfide content is low and four stages being provided in instances of high hydrogen sulfide concentration. The first stage of pressure reduction evolves a gaseous phase rich in hydrogen, which is recycled and combined with the crude hydrogen being passed to the scrubbing step, so as to recover and usefully utilize the valuable hydrogen content of the first stage gaseous phase. The pressure of the residual liquid triethanolamine solution is then reduced, and the second stage of pressure reduction evolves a gaseous phase consisting of substantially pure carbon dioxide, which may be utilized in urea synthesis or for other purposes, in some cases after a minor amount of further purification. The pressure of residual liquid triethanolamine solution is then further reduced, and the final stage of pressure reduction evolves a gaseous phase rich in hydrogen sulfide, and suitable for the production of elemental sulfur by the Claus process. The final residual lean triethanolamine solution is then re-pressurized and recycled for further scrubbing of crude hydrogen.

The procedure of the present invention possesses several advantages. The dissolved gases in the rich triethanolamine solution are efficiently removed from the solution, with particular efficiency being obtained when the pressure reduction takes place by passing the solution through power producing means, as will appear infra. The dissolved hydrogen present in the rich triethanolamine solution is usefully recovered in a usable concentrated form, suitable for recycle by addition to the crude hydrogen stream without excessive dilution of the crude hydrogen. Substantially pure carbon dioxide is also produced, which is highly important in instances when the hydrogen is to be employed in ammonia synthesis and the ammonia is utilized urea synthesis. In this case, the carbon dioxide may be subjected to a minor amount of further purification, and is then reacted with ammonia at elevated pressure to produce urea. Finally, the hydrogen sulfide content of the crude hydrogen is recovered on a usable concentrated form, and may be directly converted to valuable elemental sulfur. Thus, discharge of hydrogen sulfide into the atmosphere and consequent air pollution are prevented.

It is an object of the present invention to remove and recover impurities from crude hydrogen in an improved manner.

Another object is to regenerate a rich triethanolamine solution, derived from the scrubbing of crude hydrogen and containing dissolved hydrogen, carbon dioxide and hydrogen sulfide, by means of an improved procedure.

An additional object is to usefully recover hydrogen, carbon dioxide and hydrogen sulfide from a rich triethanolamine solution produced by the scrubbing of crude hydrogen.

A further object is to recover a hydrogen-rich gas phase, a substantially pure carbon dioxide gas phase, and a hydrogen sulfide-rich gas phase from a rich triethanolamine solution containing these dissolved components, by pressure reduction in a plurality of stages with selective evolution of these gas phases at different pressure levels.

Still another object is to more efficiently regenerate a rich triethanolamine solution containing dissolved hydrogen, carbon dioxide and hydrogen sulfide.

Still a further object is to produce substantially pure carbon dioxide for urea synthesis, from a rich triethanolamine solution containing dissolved hydrogen, carbon dioxide and hydrogen sulfide, and derived from the scrubbing of crude hydrogen.

These and other objects and advantages of the present invention will become evident from the description which follows. Referring to the figure, which is a flowsheet of a preferred embodiment of the invention and also shows an alternative mode of practicing the invention, a fluid hydrocarbon stream 1, which may consist of natural gas or one of the other fluid hydrocarbons mentioned supra, or other suitable fluid hydrocarbon, is passed into high pressure partial oxidation furnace 2, together with oxidizing gas stream 3 which may consist of substantially pure oxygen or oxygen-enriched air. A stream of steam, not shown, may also be introduced into unit 2 in some instances. The partial oxidation reaction takes place in unit 2, with the resultant generation of a high pressure hot gas stream 4 principally containing hydrogen and carbon monoxide. Stream 4 is cooled by passing through the tubes 5 of waste heat boiler 6, with condensate water stream 7 being passed into unit 6 external to the tubes 5 and generated steam being removed via stream 8. The resultant cooled process gas stream 9 is now usually mixed with added steam stream 10, and the mixed stream 11 is now subjected to the catalytic carbon monoxide shift reaction with steam to produce further hydrogen and carbon dioxide. Stream 11 is passed into converter 12 provided with catalyst bed 13, in which the shift reaction takes place. Unit 12 may be of any suitable configuration, such as the multi-bed unit described in U.S. Patent No. 3,010,807. The resultant crude high pressure hydrogen stream 14 discharged from unit 12 now contains only carbon dioxide and hydrogen sulfide as principal impurities, and is suitable for processing in accordance with the present invention. Stream 14 will usually be cooled in a waste heat boiler or heat exchanger, not shown, prior to subsequent processing.

Stream 14 is typically produced at a pressure in the range of 65 to 140 kg./sq. cm., and is initially combined with recycle hydrogen-rich stream 15, which is derived in a manner to be described infra. The resultant stream 16 is now scrubbed with aqueous triethanolamine solution for impurity removal in tower 17 provided with packed section 18. The lean aqueous triethanolamine scrub solution stream 19 is admitted into unit 17 above section 18, and flows downwards through section 18 countercurrent to the rising gas phase, with carbon dioxide, hydrogen sulfide and a minor proportion of hydrogen being thereby dissolved into the liquid phase. The residual gaseous hydrogen phase produced above section 18 is now substantially free of carbon dioxide and hydrogen sulfide, and is removed from unit 17 via stream 20 and passed to utilization in ammonia synthesis, hydrogenation, or for other purposes.

The rich liquid triethanolamine solution removed at high pressure from the bottom of unit 17 via stream 21 now contains dissolved hydrogen, carbon dioxide and hydrogen sulfide, and is processed in accordance with the present invention. Stream 21 is passed through power producing expansion device 22, which consists of a turbine, Pelton wheel or other suitable device for recovering power through the expansion or decompression of a fluid. Unit 22 is connected via shaft 23 to a power consuming device, such as an electrical generator, a pump or a fluid compressor. The resulting stream 24 discharged from unit 22 at a reduced pressure typically in the range of 35 to 60 kg./sq. cm. now contains an evolved gaseous phase as well as a residual aqueous triethanolamine liquid phase containing residual dissolved components. Stream 24 is passed into gas-liquid separator 25, which is a conventional cyclonic or baffled device for the separation of gaseous and liquid phases from a mixed stream. The gaseous phase separated in unit 25 is rich in evolved hydrogen, and contains a minor proportion of carbon dioxide. This gaseous phase is withdrawn from unit 25 via stream 26, which is compressed in compressor 27 to the pressure level of stream 14 and discharged as stream 15. Unit 27 may be any suitable compression device, such as a centrifugal, axial or reciprocating compressor.

The residual aqueous triethanolamine liquid phase in unit 25 contains residual dissolved components principally consisting of carbon dioxide and hydrogen sulfide, and is removed from unit 25 via stream 28 and passed through power producing expansion device 29 which is similar in function to unit 22 described supra. The resulting stream 30 discharged from unit 29 at a reduced pressure typically in the range of 5 to 20 kg./sq.cm. now contains an evolved gaseous phase as well as a residual aqueous triethanolamine liquid phase containing residual dissolved components. Stream 30 is passed into gas-liquid separator 31, which is a device similar in function to unit 25 described supra. The gaseous phase separated in unit 31 consists of substantially pure carbon dioxide, containing only minor or trace amounts of hydrogen and hydrogen sulfide. This gaseous phase is withdrawn from unit 31 via stream 32, and in most instances is over 99% pure carbon dioxide and is directly usable for such purposes as urea synthesis. Removal of traces of hydrogen sulfide may be attained by passing stream 32 through a suitable purification unit 33, which may contain a bed of activated carbon or other selective hydrogen sulfide adsorbent. The fully purified carbon dioxide passes from unit 33 via stream 34 to suitable process utilization.

The residual aqueous triethanolamine liquid phase in unit 31 contains residual dissolved components essentially consisting of carbon dioxide and hydrogen sulfide, and is removed from unit 31 via stream 35. Two alternative procedures for processing stream 35 are shown on the figure. In most instances, the proportion of hydrogen sulfide in stream 35 will be too low to provide a gaseous phase, by complete regeneration of stream 35, which would be sufficiently rich in hydrogen sulfide to permit subsequent processing of the gaseous phase by the Claus process or other procedures which produce elemental sulfur. Thus, in most instances, an auxiliary removal from stream 35 of impure carbon dioxide containing a minor proportion of hydrogen sulfide is provided, prior to final regeneration in which the hydrogen sulfide-rich gaseous phase is produced. In this case, stream 35 is passed via stream 36 through power producing expansion device 37, which is similar in function to unit 22 described supra. The resulting stream 38 discharged from unit 37 at a reduced superatmospheric pressure typically below 5 kg./sq.cm. now contains an evolved gaseous phase as well as a residual aqueous triethanolamine liquid phase containing residual dissolved components. Stream 38 is phased into gas-liquid separator 39, which is a device similar in function to unit 25 described supra. The gaseous phase separated in unit 39 consists of impure carbon dioxide containing a very minor proportion of hydrogen sulfide. This gaseous phase is withdrawn from unit 39 via stream 40, which is either discharged to atmosphere are separately processed to recover further pure carbon dioxide. The process units required for this purpose are relatively reduced in dimension and cost, due to the prior removal of stream 32 as described supra.

The residual aqueous triethanolamine liquid phase in unit 39 contains residual dissolved components essentially consisting of hydrogen sulfide and residual carbon dioxide, and is removed from unit 39 via stream 41 and treated for complete regeneration of the aqueous triethanolamine solution and recovery of a hydrogen sulfide-rich gas stream. Stream 41 is passed through power producing expansion device 42, which is similar in function to unit 22 described supra. The resulting stream 43 discharged from unit 42 is at a further reduced pressure, and is preferably at substantially atmospheric pressure. Stream 43 contains an evolved gaseous phase consisting essentially of a carbon dioxide-hydrogen sulfide mixture containing a substantial proportion of hydrogen sulfide, as well as a residual aqueous triethanolamine liquid phase containing only a small proportion of residual dissolved components such as hydrogen sulfide.

Stream 43 is passed into triethanolamine solution regenerator 44 above packed section 45, and the gaseous phase of stream 43 separates from the liquid phase in the upper part of unit 44. The liquid phase of stream 43 flows downwards through section 45 in extended surface contact with a rising hot vapor phase, which is generated by heating the collected liquid phase in the lower part of unit 44. Steam coil 46 is disposed within the lower part of unit 44, and is provided with heating steam via stream 47 with condensate removal via stream 48. As an alternative, heating steam may be directly sparged into the body of liquid in the lower part of unit 44. The vapor phase generated in the lower part of unit 44 rises through packed section 45, and serves to strip residual carbon dioxide and hydrogen sulfide from the downflowing liquid phase. The resultant stripped carbon dioxide and hydrogen sulfide gases join the gaseous phase of stream 43 in the upper part of unit 44, and a hydrogen sulfide-rich gas stream 49 is withdrawn from the upper part of unit 44. Stream 49 is usually sufficiently rich in hydrogen sulfide to permit direct usage of stream 49 as a hydrogen sulfide source for the production of elemental sulfur by the Claus process.

Returning to the lower section of unit 44, a fully regenerated lean aqueous triethanolamine solution stream 50 is withdrawn, repressurized by pump 51, and recycled via stream 19. Stream 50 is substantially free of dissolved carbon dioxide and hydrogen sulfide, due to the processing in unit 44. In some instances, streams 50 or 19 may be cooled in heat exchange means, not shown, prior to recycle for further crude hydrogen gas scrubbing in unit 17.

As discussed supra, in many instances the concentration of dissolved hydrogen sulfide in stream 35 may be relatively low, and units 37 and 39 are provided to produce impure carbon dioxide stream 40 and thus to avoid dilution of the hydrogen sulfide-rich final gas stream 49. In other instances, such as when stream 1 consists of a residual oil or other hydrocarbon of high sulfur content, stream 35 is relatively rich in dissolved hydrogen sulfide. In such instances, stream 35 may be passed directly to unit 42 via alternative stream 52, in which case units 37 and 39 are omitted, and stream 40 is produced as a component of stream 49.

Numerous alternatives within the scope of the present invention, besides those mentioned supra, will occur to those skilled in the art. Thus, the ranges or levels of process variables are not critical to practice of the present invention, and the invention may be practiced in suitable instances with the provision of process variables such as pressure levels outside of the ranges mentioned supra, which are merely provided to indicate optimum magnitudes of these variables for best results in most instances of practice of the invention.

The crude hydrogen gas stream 14 may be produced by other procedures besides the partial oxidation sequence described supra. Thus, stream 14 may be produced by the catalytic steam reforming of a fluid hydrocarbon, the gasification of coal, or other technology. In some instances stream 14 may be produced at low or substantially atmospheric pressure, in which case stream 14 will be compressed prior to combination with stream 15 to form stream 16. The packing beds 18 and 45 may consist of any suitable packing material, in the form of spheres, rings, saddles or other shape, and it will be evident that beds 18 or 45 or both may be replaced by other suitable gas-liquid contact means such as sieve trays, bubble cap plates etc. in some instances. In some cases, such as when stream 16 is produced at relatively low pressure, the capital cost for equipment necessary to recover usable power from stream 21 may not be economically justified. In this case, any or all of units 22, 29, 37 and 42 may be replaced by suitable fluid expansion or pressure reducing valves. Heating coils similar to unit 46 may be disposed within units 25, 31 and 39 in suitable instances, so as to heat the liquid phase within these units and thereby assist in the evolution of a gaseous phase. Finally, in some instances such as in hydrogenation procedures during petroleum refining, a lower purity of stream 20 may be satisfactory. In this case, unit 44 may be replaced by a gas-liquid separator similar to unit 25, which may be provided with a lower liquid heating coil similar to unit 46.

An example of an industrial application of the present invention will now be described.

Example

The procedure of the present invention was applied in the processing of a crude hydrogen stream prior to usage of the hydrogen in a 2000 metric ton/day ammonia plant. The crude hydrogen had a relatively high content of hydrogen sulfide, and consequently in accordance with the alternative procedure described supra, stream 35 was passed directly to unit 42 via stream 52. Following is a tabulation of the content of components in several process streams.

| Stream No. | Content of component, mols/hour | | | Total mols per hour | Pressure, kg./sq. cm. |
| --- | --- | --- | --- | --- | --- |
| | Carbon dioxide | Hydrogen plus inerts | Hydrogen sulfide | | |
| 21* | 8,245 | 392 | 297 | 8,934 | 80.0 |
| 26 | 315 | 290 | | 605 | 40.0 |
| 32 | 3,655 | 99 | Trace | 3,754 | 7.0 |
| 49 | 4,275 | 3 | 297 | 4,575 | 1.03 |

*Gas dissolved in rich TEA solution.

It is apparent that stream 26 contained 48.0% hydrogen, which was fully recovered via recycle. Stream 32 consisted of 97.4% pure carbon dioxide, and was readily further purified for urea synthesis. The hydrogen sulfide content of stream 49 was sufficient for recovery of elemental sulfur via the Claus process.

I claim:

1. In a process for removal of impurities from crude high pressure hydrogen gas containing carbon dioxide and hydrogen sulfide in which said crude hydrogen gas is scrubbed with aqueous liquid triethanolamine solution at elevated pressure, whereby said hydrogen gas is purified and a rich triethanolamine solution is produced containing dissolved hydrogen, carbon dioxide and hydrogen sulfide, the pressure of said rich triethanolamine solution is reduced to regenerate said solution by evolving hydrogen, carbon dioxide and hydrogen sulfide in the gaseous state, and the residual lean liquid triethanolamine solution is repressurized and recycled for further crude hydrogen scrubbing, the improved method of regenerating said rich triethanolamine solution and recovering hydrogen, pure carbon dioxide and a hydrogen sulfide-rich gas stream which comprises (a) reducing the pressure of said rich triethanolamine solution to an intermediate elevated pressure level, whereby a hydrogen-rich gas phase is evolved, (b) separating the gas phase of step (a) from the residual liquid triethanolamine phase, (c) adding the separated gas phase of step (b) to said crude high pressure hydrogen gas, (d) reducing the pressure of the residual liquid triethanolamine phase phase of step (b) to a lower intermediate elevated pressure level, whereby a gas phase comprising substantially pure carbon dioxide is evolved, (e) separating the carbon dioxide gas phase of step (d) from the residual liquid triethanolamine phase, (f) reducing the pressure of the residual liquid triethanolamine phase of step (e) to a final low pressure level, whereby a hydrogen sulfide-rich gas phase is evolved, and (g) separating the hydrogen sulfide-rich gas phase of step (f) from the residual liquid triethanolamine phase comprising residual lean liquid triethanolamine solution.

2. The process of claim 1, in which the final low pressure level of step (f) is substantially atmospheric pressure.

3. The process of claim 1, in which the pressure of the residual liquid triethanolamine phase is reduced to a final low pressure level in step (f) in two stages at successively lower pressure level, impure carbon dioxide containing a minor proportion of hydrogen sulfide is evolved in the first stage and separated from the residual liquid phase, and a hydrogen sulfide-rich gas phase is evolved in the second stage and separated from the residual liquid phase.

4. The process of claim 1, in which said crude hydrogen gas is scrubbed with triethanolamine solution at a pressure in the range of 65 to 140 kg./sq. cm., the pressure of the rich triethanolamine solution is reduced to an intermediate elevated pressure level in the range of 35 to 60 kg./sq. cm. in step (a), the pressure of the residual liquid triethanolamine phase is reduced to a lower intermediate elevated pressure level in the range of 5 to 20 kg./sq. cm. in step (d), and the final low pressure level of step (f) is substantially atmospheric pressure.

5. The process of claim 1, in which the pressure of the liquid triethanolamine solution is reduced to lower pressure in steps (a), (d) and (f) through mechanical power recovery means, whereby useful power is recovered during the reduction of the pressure of the liquid solution.

6. The process of claim 1, in which the residual liquid triethanolamine phase is heated during step (f), whereby evolution of a hydrogen sulfide-rich gas phase is more effectively attained.

7. In a process for removal of impurities from crude high pressure hydrogen gas containing carbon dioxide and hydrogen sulfide in which said crude hydrogen gas is scrubbed with aqueous liquid triethanolamine solution at elevated pressure, whereby said hydrogen gas is purified and a rich triethanolamine solution is produced containing dissolved hydrogen, carbon dioxide and hydrogen sulfide, the pressure of said rich triethanolamine solution is reduced to regenerate said solution by evolving hydrogen, carbon dioxide and hydrogen sulfide in the gaseous state, and the residual lean liquid triethanolamine solution is repressurized and recycled for further crude hydrogen scrubbing, the improved method of regenerating said rich triethanolamine solution and recovering hydrogen, pure carbon dioxide and a hydrogen sulfide-rich gas stream which comprises (a) reducing the pressure of said rich triethanolamine solution in a first stage to an intermediate elevated pressure level, whereby a hydrogen-rich gas phase is evolved, (b) separating the gas phase of step (a) from the residual liquid triethanolamine phase, (c) adding the separated gas phase of step (b) to said crude high pressure hydrogen gas, (d) reducing the pressure of the residual liquid triethanolamine phase of step (b) in a second stage to a lower intermediate elevated pressure level, whereby a gas phase comprising substantially pure carbon dioxide is evolved, (e) separating the carbon dioxide gas phase of step (d) from the residual liquid triethanolamine phase, (f) reducing the pressure of the residual liquid triethanolamine phase of step (e) in a third stage to a lower intermediate elevated pressure level, whereby an impure carbon dioxide gas phase containing a minor proportion of hydrogen sulfide is evolved, (g) separating the impure carbon dioxide gas phase of step (f) from the residual liquid triethanolamine phase, (h) reducing the pressure of the residual liquid triethanolamine phase of step (g) in a fourth stage to a final low pressure level, whereby a hydrogen sulfide-rich gas phase is evolved, and (i) separating the hydrogen sulfide-rich gas phase of step (h) from the residual liquid triethanolamine phase comprising residual lean liquid triethanolamine solution.

8. The process of claim 7, in which the final low pressure level of step (h) is substantially atmospheric pressure.

9. The process of claim 7, in which said crude hydrogen gas is scrubbed with triethanolamine solution at a pressure in the range of 65 to 140 kg./sq.cm., the pressure of the rich triethanolamine solution is reduced to an intermediate elevated pressure level in the range of 35 to 60 kg./sq.cm. in the first stage of step (a), the pressure of the residual liquid triethanolamine phase is reduced to a lower intermediate elevated pressure level in the range of 5 to 20 kg./sq.cm. in the second stage of step (d), the pressure of the residual liquid triethanolamine phase is reduced to a lower intermediate superatmospheric pressure level below 5 kg./sq.cm. in the third stage of step (f), and the final low pressure of the fourth stage of step (h) is substantially atmospheric pressure.

10. The process of claim 7, in which the pressure of the liquid triethanolamine solution is reduced in stages to lower pressure in steps (a), (d), (f) and (h) through mechanical power recovery means, whereby useful power is recovered during the reduction of the pressure of the liquid solution.

11. The process of claim 7, in which the residual liquid triethanolamine phase is heated during the fourth stage of step (h), whereby evolution of a hydrogen sulfide-rich gas phase is more effectively attained.

References Cited

UNITED STATES PATENTS

| | | | |
|---|---|---|---|
| 2,374,104 | 4/1945 | Kirkbride | 62—17 XR |
| 2,615,787 | 10/1952 | Randlett | 23—2 |
| 3,042,483 | 7/1962 | Wolfram | 23—2 |
| 3,203,191 | 8/1965 | French | 62—38 XR |
| 3,242,644 | 3/1966 | Woertz | 55—73 XR |

NORMAN YUDKOFF, *Primary Examiner.*

V. W. PRETKA, *Assistant Examiner.*

U.S. Cl. X.R.

23—2, 150, 181, 293; 62—17, 26